United States Patent
Fowler et al.

(10) Patent No.: US 10,040,022 B2
(45) Date of Patent: Aug. 7, 2018

(54) APPARATUS AND SYSTEM FOR SWING ADSORPTION PROCESSES RELATED THERETO

(71) Applicants: Tracy A. Fowler, Magnolia, TX (US); Shwetha Ramkumar, Cypress, TX (US); Jeffrey W. Frederick, Spring Mills, PA (US); Ananda K. Nagavarapu, Houston, TX (US); Sebastian Chialvo, Spring, TX (US); Robert F. Tammera, Warrenton, VA (US); John W. Fulton, Annandale, VA (US)

(72) Inventors: Tracy A. Fowler, Magnolia, TX (US); Shwetha Ramkumar, Cypress, TX (US); Jeffrey W. Frederick, Spring Mills, PA (US); Ananda K. Nagavarapu, Houston, TX (US); Sebastian Chialvo, Spring, TX (US); Robert F. Tammera, Warrenton, VA (US); John W. Fulton, Annandale, VA (US)

(73) Assignee: ExxonMobil Upstream Research Company, Spring, TX (US)

( * ) Notice: Subject to any disclaimer, the term of this patent is extended or adjusted under 35 U.S.C. 154(b) by 135 days.

(21) Appl. No.: 15/284,973

(22) Filed: Oct. 4, 2016

(65) Prior Publication Data
US 2017/0113176 A1  Apr. 27, 2017

Related U.S. Application Data

(60) Provisional application No. 62/246,920, filed on Oct. 27, 2015.

(51) Int. Cl.
*B01D 53/04* (2006.01)
*B01D 53/047* (2006.01)

(52) U.S. Cl.
CPC ..... *B01D 53/0446* (2013.01); *B01D 53/0473* (2013.01); *B01D 53/047* (2013.01);
(Continued)

(58) Field of Classification Search
CPC ............ B01D 53/0446; B01D 53/0462; B01D 53/047; B01D 53/0473; B01D 2256/245;
(Continued)

(56) References Cited

U.S. PATENT DOCUMENTS

| | | | | |
|---|---|---|---|---|
| 1,577,200 A | * | 3/1926 | Voress | ............... B01D 53/0423 208/340 |
| 1,868,138 A | | 7/1932 | Fisk | |

(Continued)

FOREIGN PATENT DOCUMENTS

| | | |
|---|---|---|
| CA | 2297590 | 9/2000 |
| CA | 2237103 | 12/2001 |

(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.

(Continued)

*Primary Examiner* — Frank Lawrence
(74) *Attorney, Agent, or Firm* — ExxonMobil Upstream Research Company—Law Department (57) ABSTRACT

Provided are apparatus and systems for performing a swing adsorption process. This swing adsorption process may involve passing streams through adsorbent bed units to remove contaminants, such as water, from the stream. As part of the process, the adsorbent bed unit may include additional space for the valves of the adsorbent bed unit.

24 Claims, 4 Drawing Sheets

(52) U.S. Cl.
CPC .... *B01D 53/0462* (2013.01); *B01D 2256/245* (2013.01); *B01D 2257/504* (2013.01); *B01D 2257/702* (2013.01); *B01D 2257/80* (2013.01); *B01D 2259/40003* (2013.01); *B01D 2259/40086* (2013.01)

(58) Field of Classification Search
CPC ........ B01D 2257/504; B01D 2257/702; B01D 2257/80; B01D 2259/40003; B01D 2259/40086
USPC ................. 95/96–98, 104, 105; 96/108, 152
See application file for complete search history.

(56) References Cited

U.S. PATENT DOCUMENTS

| | | | | |
|---|---|---|---|---|
| 2,678,108 A * | 5/1954 | Reid | ................. | B01D 53/0423 55/344 |
| 3,103,425 A | 9/1963 | Meyer | ............................... | 55/62 |
| 3,124,152 A | 3/1964 | Payne | ...................... | 137/269.5 |
| 3,142,547 A | 7/1964 | Marsh et al. | ...................... | 55/26 |
| 3,508,758 A | 4/1970 | Strub | ............................ | 277/15 |
| 3,602,247 A | 8/1971 | Bunn et al. | ................... | 137/270 |
| 3,722,189 A * | 3/1973 | Tourtellotte | ............ | B01D 53/62 55/DIG. 30 |
| 3,788,036 A | 1/1974 | Lee et al. | ........................ | 55/25 |
| 3,925,041 A | 12/1975 | Patterson et al. | | |
| 3,955,946 A * | 5/1976 | Fuhring | ............. | B01D 53/0423 96/130 |
| 3,967,464 A | 7/1976 | Cormier et al. | .................. | 62/13 |
| 4,187,092 A | 2/1980 | Woolley | ............................. | 62/48 |
| 4,261,815 A | 4/1981 | Kelland | .......................... | 209/213 |
| 4,324,565 A | 4/1982 | Benkmann | ....................... | 55/23 |
| 4,325,565 A | 4/1982 | Winchell | ....................... | 280/282 |
| 4,329,162 A | 5/1982 | Pitcher | ............................ | 55/523 |
| 4,340,398 A | 7/1982 | Doshi et al. | ...................... | 55/25 |
| 4,386,947 A | 6/1983 | Mizuno et al. | .................... | 55/387 |
| 4,445,441 A | 5/1984 | Tanca | ............................ | 110/165 |
| 4,461,630 A | 7/1984 | Cassidy et al. | .................... | 55/25 |
| 4,496,376 A | 1/1985 | Hradek | ........................... | 55/163 |
| 4,631,073 A * | 12/1986 | Null | .................. | B01D 53/0446 95/1 |
| 4,705,627 A | 11/1987 | Miwa et al. | .................... | 210/264 |
| 4,711,968 A | 12/1987 | Oswald et al. | ................. | 568/454 |
| 4,737,170 A | 4/1988 | Searle | ............................. | 55/179 |
| 4,770,676 A | 9/1988 | Sircar et al. | ...................... | 55/26 |
| 4,783,205 A | 11/1988 | Searle | ............................. | 55/161 |
| 4,784,672 A | 11/1988 | Sircar | ............................. | 55/26 |
| 4,790,272 A | 12/1988 | Woolenweber | ............... | 123/188 |
| 4,814,146 A | 3/1989 | Brand et al. | .................... | 422/179 |
| 4,816,039 A | 3/1989 | Krishnamurthy et al. | ....... | 55/26 |
| 4,877,429 A | 10/1989 | Hunter | ............................ | 55/162 |
| 4,977,745 A | 12/1990 | Heichberger | ..................... | 62/10 |
| 4,995,890 A * | 2/1991 | Croudace | ............... | B01D 53/04 96/111 |
| 5,110,328 A | 5/1992 | Yokota et al. | .................... | 55/180 |
| 5,125,934 A | 6/1992 | Krishnamurthy et al. | ....... | 55/25 |
| 5,169,006 A | 12/1992 | Stelzer | ....................... | 209/223.1 |
| 5,174,796 A | 12/1992 | Davis et al. | ...................... | 55/26 |
| 5,224,350 A | 7/1993 | Mehra | ............................. | 62/17 |
| 5,234,472 A | 8/1993 | Krishnamurthy et al. | ....... | 95/98 |
| 5,292,990 A | 3/1994 | Kantner et al. | ............... | 585/820 |
| 5,306,331 A | 4/1994 | Auvil et al. | ...................... | 95/42 |
| 5,354,346 A | 10/1994 | Kumar | ............................ | 95/101 |
| 5,365,011 A | 11/1994 | Ramachandran et al. | .... | 585/829 |
| 5,370,728 A | 12/1994 | LaSala et al. | .................. | 95/101 |
| 5,486,227 A | 1/1996 | Kumar et al. | | |
| 5,547,641 A | 8/1996 | Smith et al. | ................... | 422/181 |
| 5,565,018 A | 10/1996 | Baksh et al. | .................... | 95/100 |
| 5,672,196 A | 9/1997 | Acharya et al. | .................. | 95/97 |
| 5,700,310 A | 12/1997 | Bowman et al. | .................. | 95/45 |
| 5,733,451 A | 3/1998 | Coellner et al. | ................ | 210/496 |
| 5,735,938 A | 4/1998 | Baksh et al. | ................... | 95/101 |
| 5,750,026 A | 5/1998 | Gadkaree et al. | ......... | 201/502.1 |
| 5,769,928 A | 6/1998 | Leavitt | | |
| 5,792,239 A | 8/1998 | Reinhold, III et al. | ......... | 95/101 |
| 5,807,423 A | 9/1998 | Lemcoff et al. | .................. | 95/96 |
| 5,811,616 A | 9/1998 | Holub et al. | ................... | 585/504 |
| 5,827,358 A | 10/1998 | Kulish et al. | ................... | 96/115 |
| 5,906,673 A | 5/1999 | Reinhold, III et al. | ........... | 95/45 |
| 5,912,426 A | 6/1999 | Smolarek et al. | | |
| 5,924,307 A | 7/1999 | Nenov | .......................... | 62/643 |
| 5,935,444 A | 8/1999 | Johnson et al. | ............... | 210/691 |
| 5,968,234 A | 10/1999 | Midgett, II et al. | ............ | 95/120 |
| 5,976,221 A | 11/1999 | Bowman et al. | ................. | 95/45 |
| 5,997,617 A | 12/1999 | Czabala et al. | ................. | 96/130 |
| 6,007,606 A | 12/1999 | Baksh et al. | ..................... | 95/98 |
| 6,011,192 A | 1/2000 | Baker et al. | ................... | 585/818 |
| 6,023,942 A | 2/2000 | Thomas et al. | ................. | 62/613 |
| 6,053,966 A | 4/2000 | Moreau et al. | ................... | 95/96 |
| 6,063,161 A | 5/2000 | Keefer et al. | .................. | 95/100 |
| 6,096,115 A | 8/2000 | Kleinberg | | |
| 6,099,621 A | 8/2000 | Ho | ................................. | 95/139 |
| 6,129,780 A | 10/2000 | Millet et al. | .................... | 95/117 |
| 6,136,222 A | 10/2000 | Friesen et al. | ................. | 252/184 |
| 6,147,126 A | 11/2000 | DeGeorge et al. | ........... | 518/715 |
| 6,152,991 A | 11/2000 | Ackley | | |
| 6,156,101 A | 12/2000 | Naheiri | | |
| 6,171,371 B1 | 1/2001 | Derive et al. | ..................... | 95/98 |
| 6,176,897 B1 | 1/2001 | Keefer | .............................. | 95/98 |
| 6,179,900 B1 | 1/2001 | Behling et al. | ................... | 95/45 |
| 6,183,538 B1 | 2/2001 | Naheiri | | |
| 6,194,079 B1 | 2/2001 | Hekal | ............................ | 428/566 |
| 6,210,466 B1 | 4/2001 | Whysall et al. | ................ | 95/100 |
| 6,231,302 B1 | 5/2001 | Bonardi | ........................ | 415/105 |
| 6,245,127 B1 | 6/2001 | Kane et al. | ..................... | 95/101 |
| 6,284,021 B1 | 9/2001 | Lu et al. | .......................... | 95/96 |
| 6,311,719 B1 | 11/2001 | Hill et al. | ...................... | 137/312 |
| 6,345,954 B1 | 2/2002 | Al-Himyary et al. | ........ | 415/112 |
| 6,398,853 B1 | 6/2002 | Keefer et al. | ................... | 96/125 |
| 6,402,813 B2 | 6/2002 | Monereau et al. | .............. | 95/96 |
| 6,406,523 B1 | 6/2002 | Connor et al. | .................. | 96/125 |
| 6,425,938 B1 | 7/2002 | Xu et al. | | |
| 6,432,379 B1 | 8/2002 | Heung | ....................... | 423/648.1 |
| 6,436,171 B1 | 8/2002 | Wang et al. | ...................... | 95/96 |
| 6,444,012 B1 | 9/2002 | Dolan et al. | ...................... | 95/99 |
| 6,444,014 B1 | 9/2002 | Mullhaupt et al. | ............. | 95/130 |
| 6,444,523 B1 | 9/2002 | Fan et al. | ..................... | 438/257 |
| 6,451,095 B1 | 9/2002 | Keefer et al. | ................... | 96/125 |
| 6,457,485 B2 | 10/2002 | Hill et al. | ...................... | 137/240 |
| 6,471,744 B1 | 10/2002 | Hill | | |
| 6,471,939 B1 | 10/2002 | Boix et al. | ..................... | 423/706 |
| 6,488,747 B1 | 12/2002 | Keefer | ............................ | 96/125 |
| 6,497,750 B2 | 12/2002 | Butwell et al. | .................. | 95/96 |
| 6,500,234 B1 | 12/2002 | Ackley et al. | | |
| 6,500,241 B2 | 12/2002 | Reddy | ............................ | 96/134 |
| 6,500,404 B1 | 12/2002 | Camblor Fernandez et al. | ................................ | 423/706 |
| 6,503,299 B2 | 1/2003 | Baksh et al. | ..................... | 95/98 |
| 6,506,351 B1 | 1/2003 | Jain et al. | ................... | 423/239.1 |
| 6,514,318 B2 | 2/2003 | Keefer | .............................. | 95/96 |
| 6,514,319 B2 | 2/2003 | Keefer et al. | ................... | 95/101 |
| 6,517,609 B1 | 2/2003 | Monereau et al. | ............... | 95/96 |
| 6,531,516 B2 | 3/2003 | Davis et al. | .................... | 518/700 |
| 6,533,846 B1 | 3/2003 | Keefer et al. | .................... | 96/125 |
| 6,565,627 B1 | 5/2003 | Golden et al. | .................... | 95/96 |
| 6,565,635 B2 | 5/2003 | Keefer et al. | .................... | 96/125 |
| 6,565,825 B2 | 5/2003 | Ohji et al. | ...................... | 423/625 |
| 6,572,678 B1 | 6/2003 | Wijmans et al. | ................... | 95/47 |
| 6,579,341 B2 | 6/2003 | Baker et al. | ...................... | 95/39 |
| 6,593,541 B1 | 7/2003 | Herren | ..................... | 219/121.67 |
| 6,595,233 B2 | 7/2003 | Pulli | ........................ | 137/115.05 |
| 6,605,136 B1 | 8/2003 | Graham et al. | .................. | 95/98 |
| 6,607,584 B2 | 8/2003 | Moreau et al. | ................... | 95/117 |
| 6,630,012 B2 | 10/2003 | Wegeng et al. | ................. | 95/106 |
| 6,631,626 B1 | 10/2003 | Hahn | ............................. | 62/612 |
| 6,641,645 B1 | 11/2003 | Lee et al. | ......................... | 95/98 |
| 6,651,645 B1 | 11/2003 | Nunez Suarez | | |
| 6,660,064 B2 | 12/2003 | Golden et al. | ................... | 95/96 |
| 6,660,065 B2 | 12/2003 | Byrd et al. | ..................... | 95/117 |
| 6,692,626 B2 | 2/2004 | Keefer et al. | ................. | 204/491 |
| 6,712,087 B2 | 3/2004 | Hill et al. | ...................... | 137/240 |
| 6,742,507 B2 | 6/2004 | Keefer et al. | ................. | 123/585 |
| 6,746,515 B2 | 6/2004 | Wegeng et al. | ................. | 95/96 |

(56) References Cited

U.S. PATENT DOCUMENTS

| | | | |
|---|---|---|---|
| 6,752,852 B1 | 6/2004 | Jacksier et al. | 95/117 |
| 6,770,120 B2 | 8/2004 | Neu et al. | 95/96 |
| 6,773,225 B2 | 8/2004 | Yuri et al. | 415/1 |
| 6,802,889 B2 | 10/2004 | Graham et al. | 95/96 |
| 6,814,771 B2 | 11/2004 | Scardino et al. | 55/385.3 |
| 6,835,354 B2 | 12/2004 | Woods et al. | 422/139 |
| 6,840,985 B2 | 1/2005 | Keefer | 96/125 |
| 6,866,950 B2 | 3/2005 | Connor et al. | 429/13 |
| 6,889,710 B2 | 5/2005 | Wagner | 137/625.46 |
| 6,890,376 B2 | 5/2005 | Arquin et al. | 96/134 |
| 6,893,483 B2 | 5/2005 | Golden et al. | 95/96 |
| 6,902,602 B2 | 6/2005 | Keefer et al. | 95/97 |
| 6,916,358 B2 | 7/2005 | Nakamura et al. | 95/96 |
| 6,918,953 B2 | 7/2005 | Lomax, Jr. et al. | 96/130 |
| 6,921,597 B2 | 7/2005 | Keefer et al. | 429/34 |
| 6,974,496 B2 | 12/2005 | Wegeng et al. | 96/126 |
| 7,025,801 B2 | 4/2006 | Monereau | 95/8 |
| 7,027,929 B2 | 4/2006 | Wang | 702/17 |
| 7,029,521 B2 | 4/2006 | Johansson | 96/128 |
| 7,074,323 B2 | 7/2006 | Ghijsen | 208/101 |
| 7,077,891 B2 | 7/2006 | Jaffe et al. | 96/108 |
| 7,087,331 B2 | 8/2006 | Keefer et al. | 429/17 |
| 7,094,275 B2 | 8/2006 | Keefer et al. | 96/125 |
| 7,097,925 B2 | 8/2006 | Keefer et al. | 429/9 |
| 7,112,239 B2 | 9/2006 | Kimbara et al. | 96/108 |
| 7,117,669 B2 | 10/2006 | Kaboord et al. | 60/288 |
| 7,122,073 B1 | 10/2006 | Notaro et al. | |
| 7,128,775 B2 | 10/2006 | Celik et al. | 95/96 |
| 7,144,016 B2 | 12/2006 | Gozdawa | 277/399 |
| 7,160,356 B2 | 1/2007 | Koros et al. | 95/50 |
| 7,160,367 B2 | 1/2007 | Babicki et al. | 96/116 |
| 7,166,149 B2 | 1/2007 | Dunne et al. | 95/113 |
| 7,172,645 B1 | 2/2007 | Pfister et al. | 95/116 |
| 7,189,280 B2 | 3/2007 | Alizadeh-Khiavi et al. | 95/130 |
| 7,250,073 B2 | 7/2007 | Keefer et al. | 95/96 |
| 7,250,074 B2 | 7/2007 | Tonkovich et al. | 95/130 |
| 7,255,727 B2 | 8/2007 | Monereau et al. | 95/96 |
| 7,258,725 B2 | 8/2007 | Ohmi et al. | 95/41 |
| 7,276,107 B2 | 10/2007 | Baksh et al. | 95/96 |
| 7,279,029 B2 | 10/2007 | Occhialini et al. | 96/121 |
| 7,285,350 B2 | 10/2007 | Keefer et al. | 429/34 |
| 7,297,279 B2 | 11/2007 | Johnson et al. | 210/669 |
| 7,311,763 B2 | 12/2007 | Neary | 96/121 |
| RE40,006 E | 1/2008 | Keefer et al. | 95/100 |
| 7,314,503 B2 | 1/2008 | Landrum et al. | 95/50 |
| 7,354,562 B2 | 4/2008 | Ying et al. | 423/437.2 |
| 7,387,849 B2 | 6/2008 | Keefer et al. | 429/34 |
| 7,390,350 B2 | 6/2008 | Weist, Jr. et al. | 95/100 |
| 7,404,846 B2 | 7/2008 | Golden et al. | 95/103 |
| 7,438,079 B2 | 10/2008 | Cohen et al. | |
| 7,449,049 B2 | 11/2008 | Thomas et al. | 95/123 |
| 7,456,131 B2 | 11/2008 | Klett et al. | 502/417 |
| 7,510,601 B2 | 3/2009 | Whitley et al. | 96/121 |
| 7,527,670 B2 | 5/2009 | Ackley et al. | 95/96 |
| 7,553,568 B2 | 6/2009 | Keefer | 429/13 |
| 7,578,864 B2 | 8/2009 | Watanabe et al. | 55/523 |
| 7,604,682 B2 | 10/2009 | Seaton | 95/96 |
| 7,637,989 B2 | 12/2009 | Bong | 96/130 |
| 7,641,716 B2 | 1/2010 | Lomax, Jr. et al. | 95/96 |
| 7,645,324 B2 | 1/2010 | Rode et al. | 95/96 |
| 7,651,549 B2 | 1/2010 | Whitley | 95/96 |
| 7,674,319 B2 | 3/2010 | Lomax, Jr. et al. | 95/19 |
| 7,674,539 B2 | 3/2010 | Keefer et al. | 429/17 |
| 7,687,044 B2 | 3/2010 | Keefer et al. | 422/211 |
| 7,713,333 B2 | 5/2010 | Rege et al. | 95/96 |
| 7,717,981 B2 | 5/2010 | LaBuda et al. | 95/96 |
| 7,722,700 B2 | 5/2010 | Sprinkle | 95/22 |
| 7,731,782 B2 | 6/2010 | Kelley et al. | 95/139 |
| 7,740,687 B2 | 6/2010 | Reinhold, III | 95/96 |
| 7,744,676 B2 | 6/2010 | Leitmayr et al. | 95/99 |
| 7,744,677 B2 | 6/2010 | Barclay et al. | 95/114 |
| 7,758,051 B2 | 7/2010 | Roberts-Haritonov et al. | 277/401 |
| 7,758,988 B2 | 7/2010 | Keefer et al. | 429/34 |
| 7,763,098 B2 | 7/2010 | Alizadeh-Khiavi et al. | 95/96 |
| 7,763,099 B2 | 7/2010 | Verma et al. | 95/96 |
| 7,792,983 B2 | 9/2010 | Mishra et al. | 709/231 |
| 7,793,675 B2 | 9/2010 | Cohen et al. | |
| 7,806,965 B2 | 10/2010 | Stinson | 95/187 |
| 7,819,948 B2 | 10/2010 | Wagner | 95/100 |
| 7,828,877 B2 | 11/2010 | Sawada et al. | 95/96 |
| 7,828,880 B2 | 11/2010 | Moriya et al. | 95/210 |
| 7,854,793 B2 | 12/2010 | Rarig et al. | 96/116 |
| 7,858,169 B2 | 12/2010 | Yamashita | 428/116 |
| 7,862,645 B2 | 1/2011 | Whitley et al. | 95/96 |
| 7,867,320 B2 | 1/2011 | Baksh et al. | 95/96 |
| 7,902,114 B2 | 3/2011 | Bowie et al. | |
| 7,938,886 B2 | 5/2011 | Hershkowitz et al. | 95/115 |
| 7,947,118 B2 | 5/2011 | Rarig et al. | 95/98 |
| 7,947,120 B2 | 5/2011 | Deckman et al. | 95/139 |
| 7,959,720 B2 | 6/2011 | Deckman et al. | 96/130 |
| 8,016,918 B2 | 9/2011 | LaBuda et al. | 95/96 |
| 8,034,164 B2 | 10/2011 | Lomax, Jr. et al. | 95/121 |
| 8,071,063 B2 | 12/2011 | Reyes et al. | 423/248 |
| 8,128,734 B2 | 3/2012 | Song | 95/96 |
| 8,142,745 B2 | 3/2012 | Reyes et al. | 423/213.2 |
| 8,142,746 B2 | 3/2012 | Reyes et al. | 423/213.2 |
| 8,192,709 B2 | 6/2012 | Reyes et al. | 423/245.1 |
| 8,210,772 B2 | 7/2012 | Gillecriosd | 405/128.2 |
| 8,227,121 B2 | 7/2012 | Adams et al. | 429/429 |
| 8,262,773 B2 | 9/2012 | Northrop et al. | 95/114 |
| 8,262,783 B2 | 9/2012 | Stoner et al. | 96/108 |
| 8,268,043 B2 | 9/2012 | Celik et al. | 95/96 |
| 8,268,044 B2 | 9/2012 | Wright et al. | 95/96 |
| 8,272,401 B2 | 9/2012 | McLean | 137/625.11 |
| 8,287,629 B2 | 10/2012 | Fujita et al. | 96/126 |
| 8,319,090 B2 | 11/2012 | Kitamura | 136/244 |
| 8,337,594 B2 | 12/2012 | Corma Canos et al. | 95/130 |
| 8,361,200 B2 | 1/2013 | Sayari et al. | 95/139 |
| 8,361,205 B2 | 1/2013 | Desai et al. | 96/121 |
| 8,377,173 B2 | 2/2013 | Chuang | 95/135 |
| 8,444,750 B2 | 5/2013 | Deckman et al. | 95/96 |
| 8,470,395 B2 | 6/2013 | Khiavi et al. | 427/180 |
| 8,480,795 B2 | 7/2013 | Siskin et al. | 95/235 |
| 8,512,569 B2 | 8/2013 | Eaton et al. | 210/650 |
| 8,518,356 B2 | 8/2013 | Schaffer et al. | 423/220 |
| 8,529,662 B2 | 9/2013 | Kelley et al. | 95/96 |
| 8,529,663 B2 | 9/2013 | Reyes et al. | 95/96 |
| 8,529,664 B2 | 9/2013 | Deckman et al. | 95/96 |
| 8,529,665 B2 | 9/2013 | Manning et al. | 95/96 |
| 8,535,414 B2 | 9/2013 | Johnson et al. | 95/95 |
| 8,545,602 B2 | 10/2013 | Chance et al. | 95/96 |
| 8,551,444 B2 | 10/2013 | Agnihotri et al. | 423/648.1 |
| 8,573,124 B2 | 11/2013 | Havran et al. | 102/206 |
| 8,591,627 B2 | 11/2013 | Jain | 95/52 |
| 8,591,634 B2 | 11/2013 | Winchester et al. | 96/127 |
| 8,616,233 B2 | 12/2013 | McLean et al. | 137/246.22 |
| 8,657,922 B2 | 2/2014 | Yamawaki et al. | 95/96 |
| 8,673,059 B2 | 3/2014 | Leta et al. | 95/104 |
| 8,680,344 B2 | 3/2014 | Weston et al. | |
| 8,715,617 B2 | 5/2014 | Genkin et al. | 423/652 |
| 8,752,390 B2 | 6/2014 | Wright et al. | 60/780 |
| 8,778,051 B2 | 7/2014 | Weist, Jr. et al. | 95/98 |
| 8,784,533 B2 | 7/2014 | Leta et al. | 95/97 |
| 8,784,534 B2 | 7/2014 | Kamakoti et al. | 95/97 |
| 8,784,535 B2 | 7/2014 | Ravikovitch et al. | 95/98 |
| 8,795,411 B2 | 8/2014 | Hufton et al. | 95/90 |
| 8,808,425 B2 | 8/2014 | Genkin et al. | 95/96 |
| 8,808,426 B2 | 8/2014 | Sundaram | 95/96 |
| 8,814,985 B2 | 8/2014 | Gerds et al. | 95/90 |
| 8,852,322 B2 | 10/2014 | Gupta et al. | 95/136 |
| 8,858,683 B2 | 10/2014 | Deckman | 95/96 |
| 8,875,483 B2 | 11/2014 | Wettstein | 60/39.52 |
| 8,906,138 B2 | 12/2014 | Rasmussen et al. | 95/96 |
| 8,921,637 B2 | 12/2014 | Sundaram et al. | 585/823 |
| 8,939,014 B2 | 1/2015 | Kamakoti et al. | 73/38 |
| 9,005,561 B2 | 4/2015 | Leta | |
| 9,017,457 B2 | 4/2015 | Tammera | 95/96 |
| 9,028,595 B2 | 5/2015 | Sundaram et al. | |
| 9,034,078 B2 | 5/2015 | Wanni et al. | 95/8 |
| 9,034,079 B2 | 5/2015 | Deckman et al. | 95/96 |
| 9,050,553 B2 | 6/2015 | Alizadeh-Khiavi et al. | |
| 9,067,168 B2 | 6/2015 | Frederick et al. | 96/108 |
| 9,095,809 B2 | 8/2015 | Deckman et al. | 95/45 |

(56) References Cited

U.S. PATENT DOCUMENTS

| | | |
|---|---|---|
| 9,108,145 B2 | 8/2015 | Kalbassi et al. ............... 95/8 |
| 9,120,049 B2 | 9/2015 | Sundaram et al. ............. 96/121 |
| 9,126,138 B2 | 9/2015 | Deckman et al. ............... 95/95 |
| 9,162,175 B2 | 10/2015 | Sundaram ..................... 96/121 |
| 9,168,485 B2 | 10/2015 | Deckman et al. ............... 95/96 |
| 2001/0047824 A1 | 12/2001 | Hill et al. ..................... 137/312 |
| 2002/0053547 A1 | 5/2002 | Schlegel et al. |
| 2002/0124885 A1 | 9/2002 | Hill et al. ..................... 137/312 |
| 2002/0162452 A1 | 11/2002 | Butwell et al. ................. 95/96 |
| 2003/0075485 A1 | 4/2003 | Ghijsen ........................ 208/308 |
| 2003/0129101 A1 | 7/2003 | Zettel .......................... 422/179 |
| 2003/0131728 A1 | 7/2003 | Kanazirev et al. ............. 95/96 |
| 2003/0170527 A1 | 9/2003 | Finn et al. .................... 429/34 |
| 2003/0202918 A1 | 10/2003 | Ashida et al. ................ 422/180 |
| 2003/0205130 A1 | 11/2003 | Neu et al. ..................... 95/90 |
| 2003/0223856 A1 | 12/2003 | Yuri et al. ..................... 415/1 |
| 2004/0099142 A1 | 5/2004 | Arquin et al. ................. 96/134 |
| 2004/0118277 A1 | 6/2004 | Kim |
| 2004/0197596 A1 | 10/2004 | Connor et al. ................ 428/630 |
| 2004/0232622 A1 | 11/2004 | Gozdawa ..................... 277/401 |
| 2005/0005771 A1 | 1/2005 | Lomax, Jr. et al. |
| 2005/0109419 A1 | 5/2005 | Ohmi et al. ................... 141/4 |
| 2005/0114032 A1 | 5/2005 | Wang .......................... 702/14 |
| 2005/0129952 A1 | 6/2005 | Sawada et al. ............... 428/409 |
| 2005/0014511 A1 | 7/2005 | Keefer et al. ................. 96/124 |
| 2005/0145111 A1 | 7/2005 | Keefer et al. ................. 96/124 |
| 2005/0150378 A1 | 7/2005 | Dunne et al. ................. 95/113 |
| 2005/0229782 A1 | 10/2005 | Monereau et al. ............ 95/96 |
| 2005/0252378 A1 | 11/2005 | Celik et al. ................... 96/121 |
| 2006/0017940 A1 | 1/2006 | Takayama |
| 2006/0048648 A1 | 3/2006 | Gibbs et al. .................. 96/108 |
| 2006/0049102 A1 | 3/2006 | Miller et al. .................. 210/500.27 |
| 2006/0076270 A1 | 4/2006 | Poshusta et al. .............. 208/208 |
| 2006/0099096 A1 | 5/2006 | Shaffer et al. ................ 418/55.1 |
| 2006/0105158 A1 | 5/2006 | Fritz et al. .................... 428/317.9 |
| 2006/0162556 A1 | 7/2006 | Ackley et al. ................. 95/96 |
| 2006/0165574 A1 | 7/2006 | Sayari .......................... 423/210 |
| 2006/0169142 A1 | 8/2006 | Rode et al. ................... 96/129 |
| 2006/0236862 A1 | 10/2006 | Golden et al. ................ 95/96 |
| 2007/0084241 A1 | 4/2007 | Kretchmer et al. ........... 63/29.2 |
| 2007/0084344 A1 | 4/2007 | Moriya et al. ................ 95/210 |
| 2007/0222160 A1 | 9/2007 | Roberts-Haritonov et al. ........................... 277/387 |
| 2007/0253872 A1 | 11/2007 | Keefer et al. ................. 422/143 |
| 2007/0261550 A1 | 11/2007 | Ota |
| 2007/0261557 A1 | 11/2007 | Gadkaree et al. ............. 96/121 |
| 2007/0283807 A1 | 12/2007 | Whitley ....................... 95/96 |
| 2008/0051279 A1 | 2/2008 | Klett et al. ................... 502/60 |
| 2008/0072822 A1 | 3/2008 | White .......................... 118/722 |
| 2008/0128655 A1 | 6/2008 | Garg et al. ................... 252/373 |
| 2008/0282883 A1 | 11/2008 | Rarig et al. ................... 95/96 |
| 2008/0282884 A1 | 11/2008 | Kelley et al. ................. 95/96 |
| 2008/0282885 A1 | 11/2008 | Deckman et al. ............. 95/98 |
| 2008/0282886 A1 | 11/2008 | Reyes et al. .................. 95/98 |
| 2008/0282887 A1 | 11/2008 | Chance et al. ................ 95/98 |
| 2008/0282892 A1 | 11/2008 | Deckman et al. ............. 96/140 |
| 2008/0289497 A1 | 11/2008 | Barclay et al. ................ 95/114 |
| 2008/0307966 A1 | 12/2008 | Stinson ........................ 95/187 |
| 2008/0314550 A1 | 12/2008 | Greco .......................... 165/4 |
| 2009/0004073 A1 | 1/2009 | Gleize et al. .................. 422/180 |
| 2009/0014902 A1 | 1/2009 | Koivunen et al. ............. 265/11 |
| 2009/0025553 A1 | 1/2009 | Keefer et al. ................. 95/96 |
| 2009/0025555 A1 | 1/2009 | Lively et al. |
| 2009/0037550 A1 | 2/2009 | Mishra et al. ................. 708/208 |
| 2009/0071333 A1 | 3/2009 | LaBuda et al. ................ 95/96 |
| 2009/0079870 A1 | 3/2009 | Matsui ......................... 348/558 |
| 2009/0107332 A1 | 4/2009 | Wagner ........................ 95/100 |
| 2009/0151559 A1 | 6/2009 | Verma et al. .................. 95/96 |
| 2009/0162268 A1 | 6/2009 | Hufton et al. ................. 423/219 |
| 2009/0180423 A1 | 7/2009 | Kroener ....................... 370/328 |
| 2009/0241771 A1 | 10/2009 | Manning et al. ............... 95/15 |
| 2009/0284013 A1 | 11/2009 | Anand et al. .................. 290/52 |
| 2009/0294366 A1 | 12/2009 | Wright et al. |
| 2009/0308248 A1 | 12/2009 | Siskin et al. .................. 95/236 |
| 2009/0314159 A1 | 12/2009 | Haggerty ...................... 95/90 |
| 2010/0059701 A1 | 3/2010 | McLean ....................... 251/304 |
| 2010/0077920 A1 | 4/2010 | Baksh et al. .................. 95/97 |
| 2010/0089241 A1 | 4/2010 | Stoner et al. .................. 96/125 |
| 2010/0186445 A1 | 7/2010 | Minta et al. ................... 62/606 |
| 2010/0212493 A1 | 8/2010 | Rasmussen et al. ........... 95/45 |
| 2010/0251887 A1 | 10/2010 | Jain ............................. 95/46 |
| 2010/0252497 A1 | 10/2010 | Ellison et al. ................. 210/500.1 |
| 2010/0263534 A1 | 10/2010 | Chuang ........................ 95/139 |
| 2010/0282593 A1 | 11/2010 | Speirs et al. .................. 203/11 |
| 2010/0288704 A1 | 11/2010 | Amsden et al. ............... 210/688 |
| 2011/0011803 A1 | 1/2011 | Koros |
| 2011/0031103 A1 | 2/2011 | Deckman et al. ............. 203/41 |
| 2011/0067440 A1 | 3/2011 | Van Aken ..................... 62/613 |
| 2011/0067770 A1 | 3/2011 | Pederson et al. .............. 137/625.15 |
| 2011/0146494 A1 | 6/2011 | Desai et al. ................... 96/115 |
| 2011/0217218 A1 | 9/2011 | Gupta et al. .................. 423/228 |
| 2011/0271833 A1* | 11/2011 | Tentarelli ........... B01D 53/0407 95/104 |
| 2011/0277620 A1 | 11/2011 | Havran et al. ................. 89/1.14 |
| 2011/0291051 A1 | 12/2011 | Hershkowitz et al. ......... 252/373 |
| 2011/0296871 A1 | 12/2011 | Van Soest-Vercammen et al. ............................ 62/636 |
| 2011/0308524 A1 | 12/2011 | Brey et al. .................... 128/205.12 |
| 2012/0024152 A1 | 2/2012 | Yamawaki et al. ............. 95/96 |
| 2012/0031144 A1 | 2/2012 | Northrop et al. ............... 62/617 |
| 2012/0067216 A1 | 3/2012 | Corma Canos et al. ........ 95/95 |
| 2012/0152115 A1 | 6/2012 | Gerds et al. ................... 95/90 |
| 2012/0222551 A1 | 9/2012 | Deckman ...................... 95/96 |
| 2012/0222552 A1 | 9/2012 | Ravikovitch et al. .......... 95/97 |
| 2012/0222553 A1 | 9/2012 | Kamakoti et al. ............. 95/99 |
| 2012/0222554 A1 | 9/2012 | Leta et al. ..................... 95/104 |
| 2012/0222555 A1 | 9/2012 | Gupta et al. .................. 95/136 |
| 2012/0255377 A1 | 10/2012 | Kamakoti et al. ............. 73/863.23 |
| 2012/0308456 A1 | 12/2012 | Leta et al. ..................... 423/228 |
| 2012/0312615 A1 | 12/2012 | Leta et al. ..................... 95/97 |
| 2013/0061755 A1 | 3/2013 | Frederick et al. .............. 96/110 |
| 2013/0216627 A1 | 8/2013 | Galbraith et al. |
| 2013/0225898 A1 | 8/2013 | Sundaram et al. ............. 585/802 |
| 2013/0340619 A1 | 12/2013 | Tammera |
| 2014/0013955 A1 | 1/2014 | Tammera et al. .............. 96/115 |
| 2014/0060326 A1 | 3/2014 | Sundaram ..................... 95/96 |
| 2014/0157986 A1 | 6/2014 | Ravikovitch et al. .......... 95/96 |
| 2014/0208797 A1 | 7/2014 | Kelley et al. .................. 62/611 |
| 2014/0216254 A1 | 8/2014 | Tammera et al. .............. 95/114 |
| 2015/0013377 A1 | 1/2015 | Oelfke |
| 2015/0068397 A1 | 3/2015 | Boulet et al. |
| 2015/0196870 A1 | 7/2015 | Albright et al. |

FOREIGN PATENT DOCUMENTS

| | | |
|---|---|---|
| EP | 0257493 | 2/1988 |
| EP | 0426937 | 5/1991 |
| EP | 1018359 | 7/2000 |
| EP | 1577561 | 9/2005 |
| EP | 1674555 | 6/2006 |
| EP | 2823872 | 1/2015 |
| FR | 2924951 | 6/2009 |
| FR | 2 988 623 | 10/2013 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| WO | WO 99/28013 | 6/1999 |
| WO | WO2002/024309 | 3/2002 |
| WO | WO2002/073728 | 9/2002 |

(56) References Cited

FOREIGN PATENT DOCUMENTS

| WO | WO2005/090793 | 9/2005 |
|----|---------------|--------|
| WO | WO2011/139894 | 11/2011 |

OTHER PUBLICATIONS

ExxonMobil Research and Engineering and Xebec (2008) RCPSA-Rapid Cycle Pressure Swing Adsorption-An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Contercurrent Flow Model for a Bulk PSA Separation Process," *AIChE J.*, v36 (2) p. 310-314.

FlowServe (2005)"Exceeding Expectations, US Navy Cuts Maintenance Costs With Flowserve GX-200 Non-Contacting Seal Retrofits," *Face-to-Face*, v17.1, 8 pgs.

GE Oil & Gas (2007) "Dry Gas Seal Retrofit," Florene, Italy, www.ge.com/oilandgas, 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin (May 19, 2007) "Strategies for Sour Gas Field Developments," *Worley Parsons-Brochure*, 20 pgs.

Reyes, S. C. et al. (1997) "Frequency Modulation Methods for Diffusion and Adsorption Measurements in Porous Solids," *J. Phys. Chem. B*. v101, pp. 614-622.

Ruthven, D. M. et al. (1996) "Performance of a Parallel Passage Adsorbent Contactor," Gas. Sep. Purif, vol. 10, no. 1, pp. 63-73.

Stahley, J. S. (2003) "Design, Operation, and Maintenance Considerations for Improved My Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser*. v81 (242) pp. 67-73.

\* cited by examiner

APPARATUS AND SYSTEM FOR SWING ADSORPTION PROCESSES RELATED THERETO

CROSS-REFERENCE TO RELATED APPLICATION

This application claims the benefit of U.S. Provisional Patent Application 62/246,920, filed Oct. 27, 2015 entitled APPARATUS AND SYSTEM FOR SWING ADSORPTION PROCESSES RELATED THERETO, the entirety of which is incorporated by reference herein.

FIELD

The present techniques relate to a system and method associated with an enhanced swing adsorption process. In particular, the system relates to a swing adsorption process for the removing contaminants from a feed stream utilizing adsorbent bed units.

BACKGROUND

Gas separation is useful in many industries and can typically be accomplished by flowing a mixture of gases over an adsorbent material that preferentially adsorbs one or more gas components, while not adsorbing one or more other gas components. The non-adsorbed components are recovered as a separate product. The separation of gas components by adsorption is a conventional approach. Adsorptive separations may be based on the differences in equilibrium affinities of the various gas components (e.g., equilibrium separations) or on the differences in adsorption kinetics of the gas components (e.g., kinetics separations).

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gas components being more readily adsorbed within the pore structure or free volume of an adsorbent material when the gas component is under pressure. That is, the higher the gas pressure, the greater the amount of readily-adsorbed gas component adsorbed. When the pressure is reduced, the adsorbed gas component is released, or desorbed from the adsorbent material.

The swing adsorption processes (e.g., PSA and TSA) may be used to separate gas components of a gas mixture because different gas components tend to fill the micropore of the adsorbent material to different extents. For example, if a gas mixture, such as natural gas, is passed under pressure through an adsorbent bed unit, which may be referred to as an adsorption bed unit, containing an adsorbent material that is more selective towards carbon dioxide than it is for methane, at least a portion of the carbon dioxide is selectively adsorbed by the adsorbent material, and the gas exiting the adsorbent bed unit is enriched in methane. When the adsorbent material reaches the end of its capacity to adsorb carbon dioxide, it is regenerated by reducing the pressure, thereby releasing the adsorbed carbon dioxide. The adsorbent material is then typically purged and repressurized. Then, the adsorbent material is ready for another adsorption cycle.

The swing adsorption processes typically involve adsorbent bed units, which include an adsorbent bed having adsorbent material disposed within the housing of the adsorbent bed unit. These adsorbent bed units utilize different packing material in the bed structures. For example, the adsorbent bed units may utilize checker brick, pebble beds or other available packing. As an enhancement, some adsorbent bed units may utilize engineered packing within the adsorbent bed structure. The engineered packing may include a material provided in a specific configuration, such as a honeycomb, ceramic forms or the like.

Further, various adsorbent bed units may be coupled together with conduits and valves to manage the flow of fluids. Orchestrating these adsorbent bed units involves coordinating the cycles for each of the adsorbent bed unit with other adsorbent bed units in the system. A complete cycle can vary from seconds to minutes as it transfers a plurality of gaseous streams through one or more of the adsorbent bed units.

However, swing adsorption processes present certain challenges because of several demanding technical factors, such as rapid cycle adsorption processes. The factors include maintaining a low pressure drop through the adsorbent bed, providing good flow distribution within the adsorbent bed and minimizing dispersion (e.g., axial spreading) of the concentration front in the adsorbent bed. Also, another factor may include rapid cycling time that requires fast acting and low dead-volume valves. Finally, yet another factor may include that an adsorbent bed unit should be configured to contain the adsorbent bed at various pressures, to support the fast acting valves, and to minimize the dead volume within the adsorbent bed unit.

These challenges are even more complicated for processes with very high volumetric flows. A conventional rapid cycle adsorbent bed unit is configured as a vertical cylinder with flat endplates (heads) for minimizing dead volume. Flow enters and exits the adsorbent bed unit through fast-acting valves mounted on the flat heads adjacent to the adsorbent material. The requirements for flat heads and high design pressures introduce practical limitations to the adsorbent bed diameter. For example, for a maximum working pressure of 85 bar absolute (bara), the practical maximum adsorbent bed unit inside diameter is approximately 1.4 meters (m), and the corresponding flat head thickness is approximately 355 millimeters (mm) to 380 mm. The fatigue life and cyclic deflection of the head is strongly influenced by the number and sizes of bores through the head for the valves. As such, the number and size of the bores through the head is a limiting factor in the design of an adsorbent bed unit.

Accordingly, there remains a need in the industry for apparatus, methods, and systems that provided enhancements to manage the flow of fluids to the adsorbent beds. The present techniques overcome the drawbacks of conventional adsorption approaches by using oversized heads to provide flow paths for the gas volumes. This present techniques provide a lower capital investment, much smaller equipment foot-print, and lower hydrocarbon losses, compared to conventional gas conditioning processes.

SUMMARY OF THE INVENTION

In one embodiment, the present techniques describe a cyclical swing adsorbent bed unit for removing contaminants from a gaseous feed stream. The adsorbent bed unit comprising: a housing forming an interior region; an adsorbent bed disposed within the interior region of the housing;

a plurality of valves secured to the housing, wherein each of the plurality of valves is in flow communication with a conduit and configured to control fluid flow along a flow path extending from a location external to the housing through the conduit and to the adsorbent bed through the valve, wherein each of the plurality the valves has a cross sectional area within an interface cross sectional area of the adsorbent bed and the aspect ratio of the interface cross sectional area is greater than 2. Also, the aspect ratio of the interface cross sectional area may be in the range between 3 and 12 or 3 and 7.

In yet another embodiment, a process for removing contaminants from a feed stream. The process comprising: a) performing one or more adsorption steps in an adsorbent bed unit, wherein each of the one or more adsorption steps comprise: (i) opening a plurality of feed poppet valves to pass a gaseous feed stream from a feed inlet conduit to an adsorbent bed disposed in an interior region of a housing of the adsorbent bed unit, wherein each of the plurality of feed poppet valves is in direct flow communication with the feed inlet conduit and configured to control fluid flow along a flow path extending from a location external to the housing through the feed inlet conduit and to the adsorbent bed, wherein each of the plurality of feed poppet valves valve cross sectional areas are within an interface cross sectional area of the adsorbent bed and the aspect ratio of the interface cross sectional area is greater than 2, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit; b) performing one or more purge steps, wherein each of the one or more purge steps comprise passing a purge stream into the adsorbent bed unit to conduct away at least a portion of the one or more contaminants in a purge output stream; and c) repeating the steps a) to b) for at least one additional cycle, wherein the cycle duration is for a period greater than 1 second and less than 600 seconds.

In still yet another embodiment, a method of manufacturing a cyclical swing adsorbent bed unit. The method comprising: forming a housing having an interior region; creating a plurality of valve ports into the housing; securing a valve to the housing in each of the plurality of valve ports to form a plurality of valves; and disposing an adsorbent bed within the interior region of the housing wherein each of the plurality of valves is configured to control fluid flow along a flow path extending from a location external to the housing to the adsorbent bed, wherein each of the plurality the valves has a valve cross sectional area within an interface cross sectional area of the adsorbent bed and the aspect ratio of the interface cross sectional area is greater than 2. The method may further include disposing a sealing element around the adsorbent bed prior to disposing an adsorbent bed within the interior region of the housing and mechanically activating, such as inflating, the sealing element after the adsorbent bed is disposed within the interior region of the housing to form a pressure boundary between the housing and the adsorbent bed.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "aspect ratio" refers to a ratio of the length of an adsorbent bed divided by the width of the adsorbent bed as defined by interface cross sectional area of the adsorbent bed. For determining the aspect ratio, the length is the larger number as compared to the width, if the length and width are not the same value. For example, a circular prism shaped adsorbent bed unit has an aspect ratio of 1, where the length and the width are the diameter of the interface cross sectional area of the adsorbent bed (e.g., a circular cross sectional area), while a rectangular prism shaped adsorbent bed unit may have an aspect ratio of 2, where the length is 2 times the width for the interface cross sectional area of the adsorbent bed (e.g., a rectangular cross sectional area).

As used herein, "conduit" refers to a tubular member forming a channel through which something is conveyed. The conduit may include one or more of a pipe, a manifold, a tube or the like.

The term "in direct flow communication" or "in direct fluid communication" means in direct flow communication without intervening valves or other closure means for obstructing flow. However, the term "in direct flow communication" may include distributors or other distribution mechanisms to distribute the flow along the flow path. As may be appreciated, other variations may also be envisioned within the scope of the present techniques.

The term "interface cross sectional area" means the cross sectional area of an end of the adsorbent bed where the stream enters or exits the adsorbent bed. For example, if a feed stream enters an adsorbent bed at a first end, the cross sectional area of the first end is the interface cross sectional area. As may be appreciated, other variations may also be envisioned within the scope of the present techniques.

The term "valve cross sectional area" means the cross sectional area of a valve relative to an end of the valve where the stream enters or exits the valve. For example, the valve opening may be the valve cross sectional area. In particular, for a poppet valve, a disk element moves to provide a flow passage around the disk element when it is in the open position. Accordingly, the valve opening formed by the disk element's movement away from the valve seat is utilized to determine the valve cross sectional area for the poppet valve, which may be the cross sectional area of the disk element. As may be appreciated, other variations may also be envisioned within the scope of the present techniques.

The term "valve cross sectional area within an interface cross sectional area" means that the valve cross sectional area is inside the interface cross sectional area when viewed along an axis passing directly through the adsorbent bed along the predominate flow path. For example, the adsorbent bed has an interface at one end where flow enters or exits the adsorbent bed. The interface has a length and a width, while the depth is direction of flow of the stream along the predominate flow path through the adsorbent bed.

As used herein, volume percent is based on standard conditions. The standard conditions are normalized to the temperature of 0° C. (e.g., 32° F.) and absolute pressure of 100 kiloPascals (kPa) (1 bar).

The present techniques may be used to lessen contaminants of the stream to a specific level. As noted above, the conventional approaches have valves directly above the adsorbent bed and within the interface cross sectional area. However, if the valves necessary to control the flow of streams to the adsorbent beds are larger than the footprint available above the adsorbent bed (e.g., exceeds space available over the interface cross sectional area), alternate configurations are necessary. The present techniques include various embodiments, which are shown below to overcome the limitations.

The present techniques relate to a swing adsorption process (e.g., a rapid cycle process) for the removing contaminants from a feed stream (e.g., natural gas) utilizing rapidly cycled streams through adsorbent beds. The present techniques balances the interface cross sectional area of the adsorbent bed unit being minimized, while maximizing the volumetric throughput. The high volumetric throughputs involved tend to involve larger sized valves (e.g., valves having a larger valve cross sectional area) and/or a larger number of valves. In many conventional configurations, the surface area of the head for the adsorbent bed unit provides insufficient space (e.g., not adequate available on the flat head) for the required number of valves and associated size of the valves. Accordingly, the present technique provides an adsorbent bed unit that balances the number of valves with the interface cross sectional area of adsorbent bed in the adsorbent bed unit. Further, the configuration may minimize the number of adsorbent bed units utilized for a given application. By way of example, the configuration may be changed to increase the lateral length as compared to the width, to adjust the adsorbent bed shapes (e.g., rectangular) and/or to change the aspect ratio of the footprint (e.g., surface area used for valves) to accommodate the valves.

In contrast to conventional approaches, the present techniques provide additional space for fluid flow into the adsorbent bed by having the adsorbent bed utilized in a different configuration that increases the aspect ratio of the interface cross sectional area (e.g., a rectangular prism configuration and/or having different shapes for the interface cross sectional area). For example, in conventional configurations, the adsorbent bed has an interface cross section area that is typically circular, which has the valves in direct flow communication with the adsorbent bed disposed adjacent to the adsorbent bed and within the interface cross sectional area. In the present techniques, the configuration involves an aspect ratio that provides more space for valves to be disposed adjacent to the adsorbent bed and within the interface cross sectional area as compared to conventional circular prism adsorbent bed configurations. The present techniques may provide valves disposed along a longer length portion of the adsorbent bed, which may involve forming the bed into different shapes than are conventionally utilized. In such configurations, the length to width ratio or aspect ratio of the interface cross sectional area is greater than 1.1; greater than 2; greater than 3; and/or greater than 4, and the length to width ratio or aspect ratio of the interface cross sectional area is less than 12, less than 7, or less than 5. For example, the aspect ratio may be in the range between 2 and 12; in the range between 3 and 12; in the range between 3 and 9; in the range between 3 and 7; or in the range between 4 and 5.

In one or more embodiments, the adsorbent bed unit may be a rectangular prism configuration of an adsorbent bed unit. In this configuration, the adsorbent bed unit may be oriented horizontally and may be formed from a pipe, by forging, by casting, or other suitable methods. The adsorbent bed may be installed longitudinally within the adsorbent bed unit, and the valves may be installed along the top and bottom of the adsorbent bed unit facilitating flow in the longitudinal direction. In this configuration, the valves may be disposed on the opposite sides (e.g., top and bottom) of the adsorbent bed unit, and the adsorbent bed may be mounted in between the valves. The gap between the housing and the adsorbent beds may be sealed to prevent flow bypassing around the adsorbent bed. The gross direction of flow in the adsorbent bed unit may be through the adsorbent bed from one set of valves to another set of valves, but local flows across the interface surfaces of the adsorbent bed may also occur to facilitate flow distribution.

In other embodiments, the present techniques may include an assembly concept for a rectangular prism adsorbent bed unit. In this configuration, the valves may be mounted onto welded mounting bosses for thin-walled adsorbent bed units, or onto a machined mounting face for thicker-walled adsorbent bed units. Also, in this configuration, the adsorbent bed may be installed from one of the non-interface ends of the adsorbent bed units, which provides the ability to remove and reinstall the absorbent bed without dismantling the valves or process piping, which may be secured via welding. Accordingly, the non-interface ends of the adsorbent bed unit may be flanged with flat heads, with elliptical heads and/or hemispherical heads, which may serve to lessen the wall thickness. This rectangular prism adsorbent bed unit configuration may be suitable for applications involving low dead volume, and in which the adsorbent bed flow length is relatively short. The inside diameter of the adsorbent bed unit is proportional to the diagonal dimension of the adsorbent bed. As the bed flow length increases, the inside diameter of the adsorbent bed unit has to increase. Accordingly, the configuration may be more beneficial for the adsorbent bed unit's diameters of approximately one meter or less, although this may be application specific.

Beneficially, the present techniques include various enhancements as compared to conventional configurations. For example, the configuration may be increased in length in a relatively easy manner to accommodate different adsorbent bed volumes and/or more valves, as necessary. Furthermore, a modular design may be developed for a unit flow rate and scaled to the desired flow rate by duplicating these modules. Another enhancement may include the ability to accommodate a large number of valves for varying services on a single adsorbent bed unit, which may overcome the limitations imposed by the conventional configurations of adsorbent bed unit having an inner diameter. Further, the present techniques may provide lighter adsorbent bed units due to ability to use a thinner housing or walls for the adsorbent bed unit, while maintaining a low dead volume because the valves are adjacent to the adsorbent bed and within the interface cross sectional area. Also, through the access via one of the ends, the configuration provides easy access for repair and maintenance of the adsorbent bed internals.

Also, the present techniques may also include various pressures for the streams, such as the feed stream and the purge stream. For example, the pressures within the housing may be in the range from 5 pounds per square inch absolute (psia) and 1,400 psia. Further, the feed pressure may be based on the preferred adsorption feed pressure, which may be in the range from 400 psia to 1,400 psia, in the range from 600 psia to 1,200 psia. Also, the purge pressure may be based on the preferred adsorbent purge pressure, which may be in the range from 50 psia to 800 psia, in the range from 400 psia to 600 psia.

The present techniques may be integrated into various configurations. For example, the adsorbent bed unit may include structured or unstructured, and the adsorbent bed unit may also include additional features to facilitate flow straightening and flow distribution. Also, the present techniques may be utilized, but not limited to, dehydration prior to and integrated with a cryogenic Natural Gas Liquid (NGL) recovery, which may involve removing contaminants to cryogenic processing feed gas specifications. Other integrations may include liquefied natural gas (LNG) plant, or other such plants. Regardless, the present techniques may be used to treat feed streams containing excessive amounts of contaminants, such as water and $CO_2$. The present techniques may also be used to remove contaminants to other specifications, such as cryogenic natural gas liquefaction specifications for a cryogenic natural gas liquefaction recovery plant.

In one or more embodiments, the present techniques can be used for any type of swing adsorption process. Non-limiting swing adsorption processes for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure/temperature swing adsorption. Exemplary kinetic swing adsorption processes are described in U.S. Patent Application Publication Nos. 2008/0282892, 2008/0282887, 2008/0282886, 2008/0282885, 2008/0282884 and 2014/0013955, which are each herein incorporated by reference in their entirety.

In certain embodiments, the adsorbent bed unit may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head or housing. The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. Also, the valves may be actively-controlled valves and/or passively-controlled valves. A passively-controlled valve may be opened by the differential pressure acting across its moving element (e.g., disk element) without the need to otherwise actuate the moving element.

Adsorptive separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare feed products (e.g., natural gas products) by removing contaminants and heavy hydrocarbons (e.g., hydrocarbons having at least two carbon atoms). The provided processes, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery. The present techniques may be further understood with reference to the FIGS. 1 to 6 below.

Figure 1:
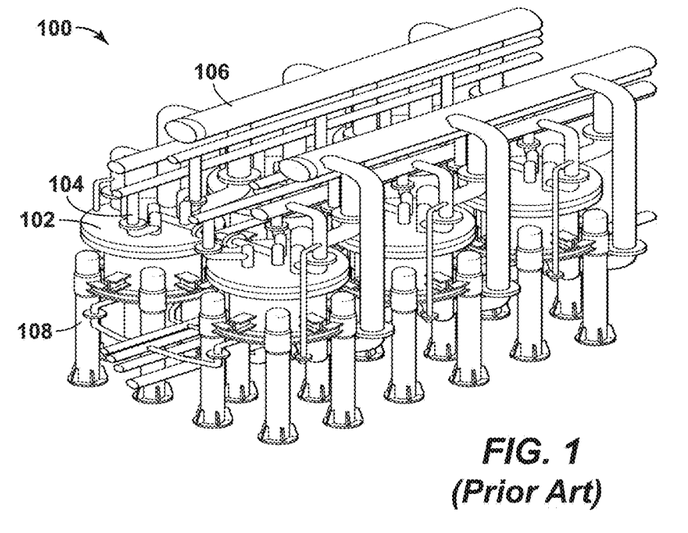
FIG. 1 is a three-dimensional diagram of a swing adsorption system with six conventional adsorbent bed units and interconnecting piping.

FIG. 1 is a three-dimensional diagram of a swing adsorption system 100 having six conventional adsorbent bed units and interconnecting piping. While this configuration is a specific example of a conventional skid, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the swing adsorption process.

Figure 2:
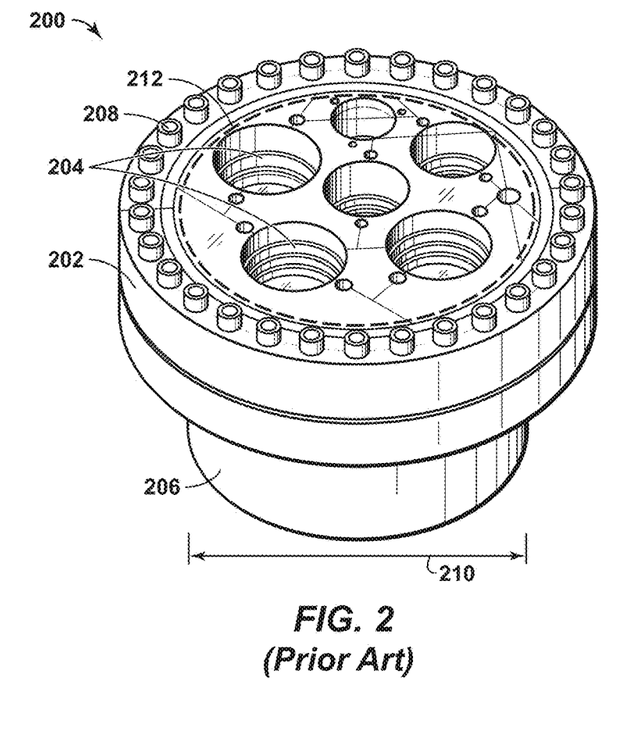
FIG. 2 is a schematic diagram of a partial view of a conventional adsorbent bed unit.

As an example, FIG. 2 illustrates a schematic diagram of a partial view of a conventional adsorbent bed unit 200. The adsorbent bed unit 200 includes a flat head 202 with valve bores or valve openings 204. The flat head 202 is connected to a flanged cylindrical housing 206 via bolts 208, which is truncated in this partial view. In this diagram, the valves (not shown) are disposed in the valve openings 204. These valve openings are within the interface cross sectional area of the adsorbent bed, which is a circular area based on the diameter 210 and dashed line 212 and has an aspect ratio of 1.

As noted in this diagram, the valves, which disposed in the valve openings 204, are disposed directly above the adsorbent bed, which are within the interface cross sectional area. However, if the valves necessary to control the flow to the adsorbent bed is larger than the footprint available above the adsorbent bed, the configuration does not support the flow of the fluids.

The present techniques involve different configurations to provide more space or footprint to support more valves as compared to conventional configurations. For example, the present techniques may include disposing valves on the portion of the adsorbent bed unit within the interface cross sectional area for adsorbent bed unit that have an aspect ratio greater than 1.1; greater than 2; greater than 3; and/or greater than 4, and the length to width ratio or aspect ratio of the interface cross sectional area is less than 12, less than 7, or less than 5. For example, the aspect ratio may be in the range between 2 and 12; in the range between 3 and 12; in the range between 3 and 9; in the range between 3 and 7; or in the range between 4 and 5. Further, present techniques may include forming the adsorbent bed in different forms, such as a rectangular prism or other suitable prism forms. Beneficially, the present techniques adjust the aspect ratio of the adsorbent bed, such that the footprint is configured to accommodate larger valves and/or a larger number of valves, as compared to conventional circular prism configurations.

In certain embodiments, the adsorbent bed unit may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the housing or a disk element that is seatable within a separate valve seat inserted within the housing (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers.

The adsorbent bed comprises a solid adsorbent material capable of adsorbing one or more components from the feed stream. Such solid adsorbent materials are selected to be durable against the physical and chemical conditions within the adsorbent bed unit and can include metallic, ceramic, or other materials, depending on the adsorption process. Further examples of adsorbent materials are noted further below.

Figure 3:
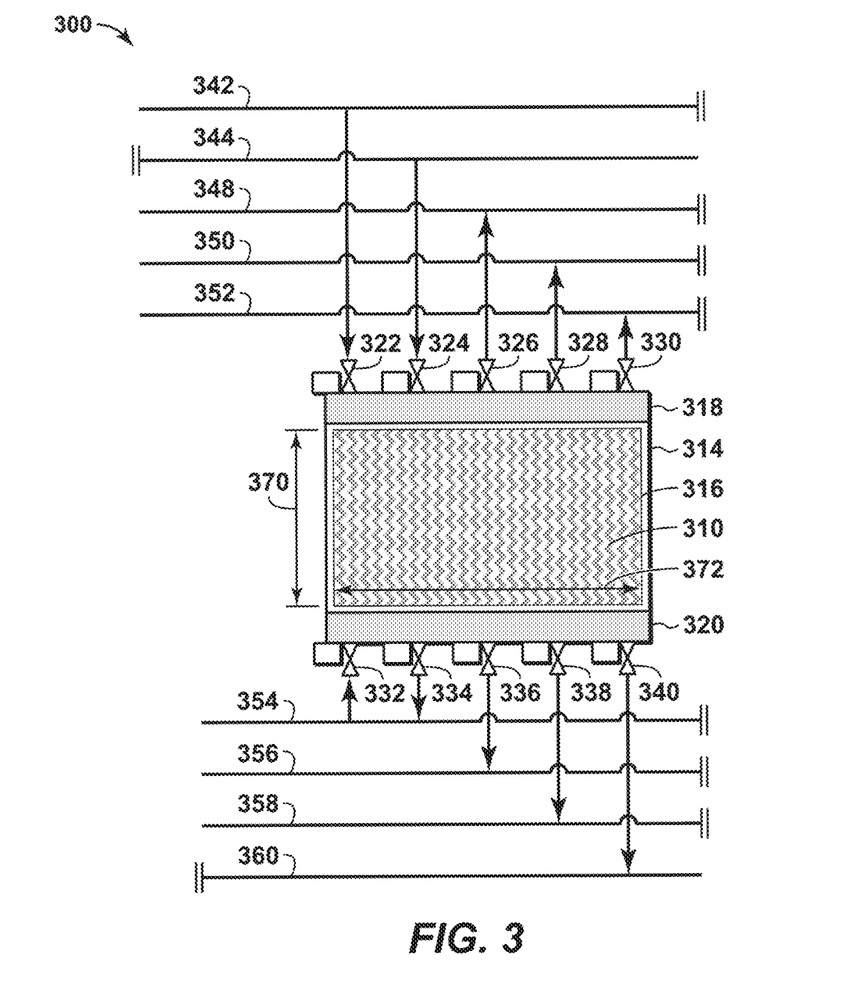
FIG. 3 is a diagram of a portion of an adsorbent bed unit having associated valve assemblies and manifolds in accordance with an embodiment of the present techniques.

By way of example, FIG. 3 is a diagram 300 of a portion of an adsorbent bed unit having valve assemblies and manifolds in accordance with an embodiment of the present techniques. The portion of the adsorbent bed unit, which may be used in a configuration similar to the adsorbent bed units of FIG. 1, includes a housing or body, which may include a wall 314 and insulation layer 316 along with an upper head 318 and a lower head 320. An adsorbent bed 310 is disposed between an upper head 318 and a lower head 320 and the insulation layer 316, resulting in an upper open zone, and lower open zone, which open zones are comprised substantially of open flow path volume. Such open flow path volume in adsorbent bed unit contains gas that has to be managed for the various steps. The housing may be configured to maintain a pressure between 0 bara (bar absolute) or 0.1 bara and 100 bara within the interior region.

The upper head 318 and lower head 320 contain openings in which valve structures can be inserted, such as valve assemblies 322 to 340, respectively (e.g., poppet valves). The upper or lower open flow path volume between the respective head 318 or 320 and adsorbent bed 310 can also contain flow distributors (not shown) which directly introduce fluids into the adsorbent bed 310 in a substantially uniform manner. The flow distributor may include a perforated plate, circular plate or other device that distributes the flow over the adsorbent bed. The upper head 318 contains various openings (not show) to provide flow passages through the inlet manifolds 342 and 344 and the outlet manifolds 348, 350 and 352, while the lower head 320 contains various openings (not shown) to provide flow passages through the inlet manifold 354 and the outlet manifolds 356, 358 and 360. Disposed in fluid communication with the respective manifolds 342 to 360 are the valve assemblies 322 to 340. If the valve assemblies 322 to 340 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating mechanisms may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In this configuration, the adsorbent bed may be a rectangular prism having an adsorbent bed depth 370 and an adsorbent bed length 372 and an adsorbent bed width (not shown). The adsorbent bed depth 370 is distance through the adsorbent bed 310 between the interfaces with the adsorbent bed 310 (e.g., respective ends of the adsorbent bed 310 that the fluid enters and exits). The adsorbent bed length 372 is the distance from one end of the adsorbent bed to the other end of the adsorbent bed along non-interface ends of the adsorbent bed (e.g., respective ends of the adsorbent bed unit that are not along a flow path through the adsorbent bed or perpendicular to the flow path through the interfaces of the adsorbent bed). The adsorbent bed width is the distance from one end of the adsorbent bed to the other end of the adsorbent bed along the other non-interface ends of the adsorbent bed, which are different ends from the length ends (e.g., respective ends of the adsorbent bed unit that are perpendicular to the ends of the adsorbent bed used to measure the length). The adsorbent bed length and adsorbent bed width are the interface cross sectional area for the adsorbent bed in this configuration. Further, the valve assemblies 322 to 340 are disposed along a portion of the adsorbent bed 310 that extends along the adsorbent bed length 372 and the valve cross sectional areas are within the interface cross sectional area, which is defined by the adsorbent bed 310.

To provide additional spacing for valve assemblies 322 to 340, the adsorbent bed length 372 may be extended to be greater than the adsorbent bed width. For example, the ratio of the adsorbent bed length 372 to adsorbent bed width may be greater than 1.1; greater than 2; greater than 3; and/or greater than 4, and the length to width ratio or aspect ratio of the interface cross sectional area is less than 12, less than 7, or less than 5. For example, the aspect ratio may be in the range between 2 and 12; in the range between 3 and 12; in the range between 3 and 9; in the range between 3 and 7; or in the range between 4 and 5.

In swing adsorption processes, the cycle involves two or more steps that each has a certain time interval, which are summed together to be the cycle time. These steps include regeneration of the adsorbent bed following the adsorption step using a variety of methods including pressure swing, vacuum swing, temperature swing, purging (via any suitable type of purge fluid for the process), and combinations thereof. As an example, a swing adsorption cycle may include the steps of adsorption, depressurization, purging, and re-pressurization. When performing the separation at high pressure, depressurization and re-pressurization (which may be referred to as equalization steps) are performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

Moreover, in other embodiments, the valve assemblies may be installed in a body portion of the housing, while the heads may not include any valve assemblies. For example, the wall 314 and heads 318 and 320 may be reversed. In this configuration, the wall 314 may be configured as a head that is attached to a body portion, while the heads 318 and 320 may be a body portion of the housing. In this configuration, the adsorbent bed 310 may be removed along with the insulation layer 316 via one or more of the heads on the side of the adsorbent bed unit to lessen disruption of the respective manifolds 342 to 360 are the valve assemblies 322 to 340.

Figure 4:
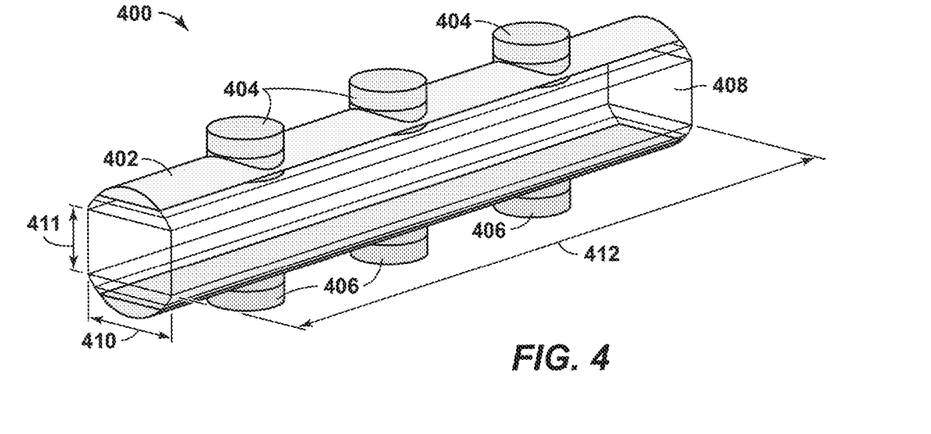
FIG. 4 is an exemplary diagram of an alternative adsorbent bed unit utilizing a rectangular prism adsorbent bed unit configuration in accordance with an embodiment of the present techniques.

In yet another embodiment, another configuration may include adjustments that lessen changes to the dead volume. For example, FIG. 4 is an exemplary diagram 400 of a modified vertical cylindrical adsorbent bed unit in accordance with an embodiment of the present techniques. In this diagram 400, the primary valves, such as primary valves 404, on the housing 402 of the adsorbent bed unit are disposed within the perimeter or interface cross sectional area of the adsorbent bed 408, while the secondary valves, such as secondary valve 406, are disposed within the interface perimeter or interface cross sectional area of the opposite end of the adsorbent bed 408. In particular, the respective valve cross sectional area for the primary valves 404 and the secondary valve 406 are disposed within the interface cross sectional area for the respective ends of the adsorbent bed 408. The adsorbent bed has an adsorbent bed length 412, adsorbent bed width 411 and an adsorbent bed depth 410. In this configuration, the aspect ratio is the adsorbent bed length 412 divided by the adsorbent bed width 411 for the adsorbent bed 408.

In this configuration, the adsorbent bed unit is oriented horizontally and may be made of pipe, a forging, casting, or other methods. Also, this configuration provides flexibility in the valve location, such that more valves may be used than can be located directly on the head, but still maintain the valves adjacent to the adsorbent bed and within the interface perimeter or interface cross sectional area of the adsorbent bed. The adsorbent bed is installed longitudinally within the adsorbent bed unit, and the valves are installed along the top and bottom of the adsorbent bed unit facilitating flow in the longitudinal direction. Beneficially, this configuration provides the ability to locate a higher number of valves or larger valves than possible in the available space on conventional circular prisms having a flat head and a circular interface cross sectional area.

Figure 5:
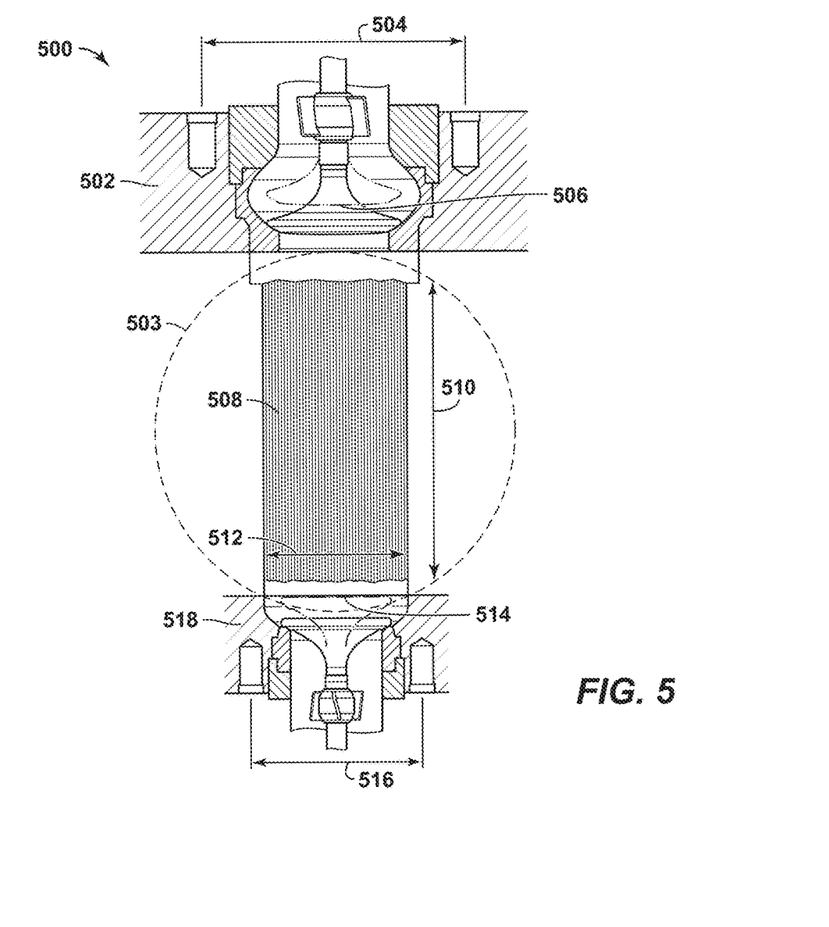
FIG. 5 is an exemplary diagram of a cross-sectional view of the rectangular prism adsorbent bed unit configuration in accordance with an embodiment of the present techniques.

FIG. 5 is an exemplary diagram 500 of a cross sectional view of the adsorbent bed unit configuration of FIG. 4 in accordance with an embodiment of the present techniques. This diagram 500 is an end view of an adsorbent bed unit, which may be one embodiment of the configuration of FIG. 4. In the diagram, the adsorbent bed 508 has an adsorbent bed depth 510, an adsorbent bed width 512, and an adsorbent bed length (not shown). The valves 506 and 514 are mounded to the top and bottom of the adsorbent bed unit via bolts coupled to a head 502 and 518, which are separated by distances 504 and 516. The adsorbent bed 508 is mounted in between the valves 506 and 514 and within the housing 503. The interface between the housing 503 and the adsorbent bed 508 are sealed (not illustrated) to prevent flow bypassing around the adsorbent bed 508. The direction of flow in the adsorbent bed unit is through the adsorbent bed 508 from one set of valves, such as valve 506, to the other set of valves, such as valve 514. Also, local flows across the top and bottom interfaces of the adsorbent bed 508 may also facilitate flow distribution (e.g., the respective ends of the adsorbent bed 508 near the valves 506 and 514).

Further, the aspect ratio of the valve cross sectional area may be about equal to one of the dimensions of the interface cross sectional area (e.g., the adsorbent bed length or adsorbent bed's width). In this configuration, the poppet valves, which each have a valve cross sectional area may be formed in a row along the length of the adsorbent bed unit, which may have a rectangular interface cross sectional area. The excess area of the poppet valves (e.g., occupied by the poppet valve housing) is outside the interface cross sectional area of the adsorbent bed. As a result, the available surface area or footprint is utilized in a more efficient manner, as compared to an adsorbent bed having a circular interface cross sectional area.

Figure 6:
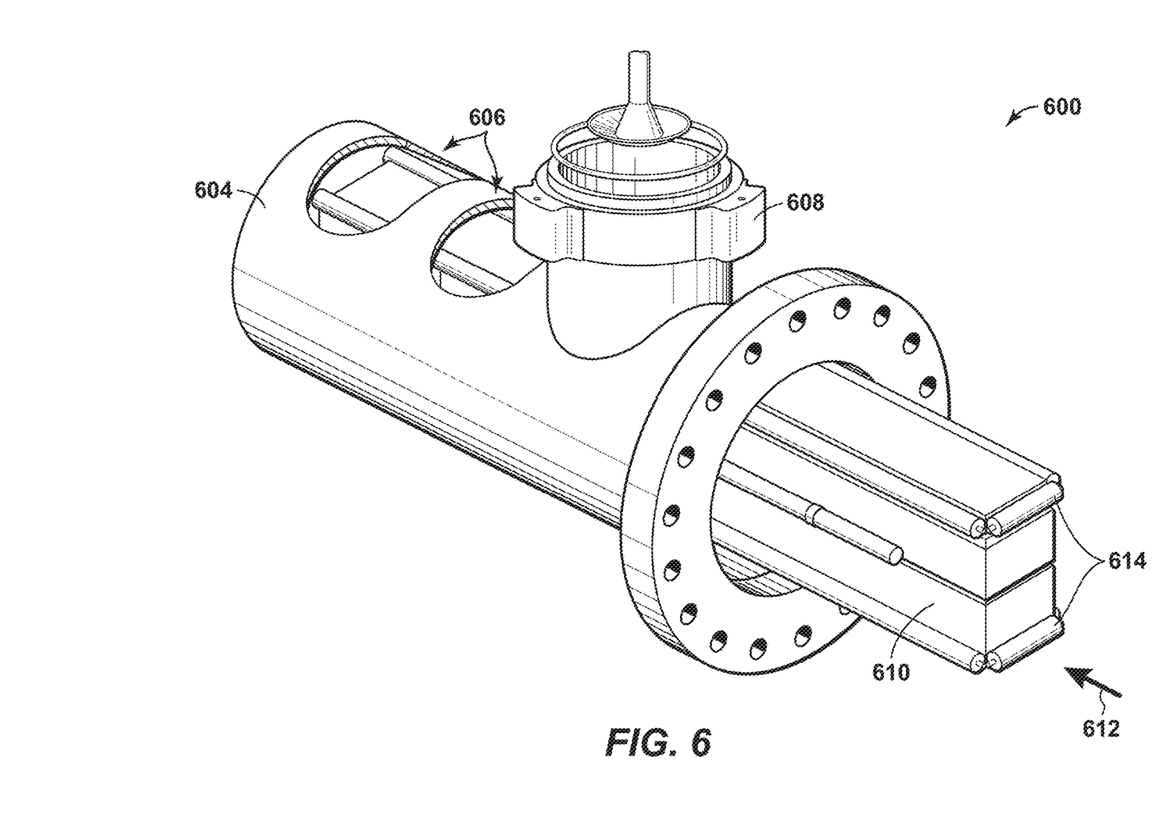
FIG. 6 is an exemplary diagram of another alternative view of the rectangular prism adsorbent bed unit configuration in accordance with an embodiment of the present techniques.

FIG. 6 is an exemplary diagram 600 of another alternative view of the rectangular prism adsorbent bed unit configuration in accordance with an embodiment of the present techniques. In this diagram 600, the body portion 604 is formed from a tubular member, which has various valve openings 606 formed within the body portion. In one of the valve openings, a valve assembly 608 is inserted to provide a flow path from a location external to the body portion 604 to the adsorbent bed 610, which is disposed within the body portion 604. The adsorbent bed 610 is inserted into the body 604 in a direction, as shown by arrow 612, and may include sealing elements 614 to hinder flow from bypassing or flowing around the adsorbent bed 610. In this configuration, the non-interface end of the adsorbent bed 610 is adjacent to a head (not shown) to provide access without having to disrupt the valves and associated conduits. The access for maintenance of the adsorbent bed may be provided through a flanged end.

As may be appreciated, the rectangular prism adsorbent bed unit may be fabricated through various methods in different configurations. For example, the valves may be mounted onto welded mounting bosses for thin-walled adsorbent bed units, or onto a machined mounting face for thicker-walled adsorbent bed units. The adsorbent bed may be installed from one end of the adsorbent bed unit, while the other end of the adsorbent bed unit may be a solid body portion, a secured head or may include one or more valves for additional flow paths. Further, the sealing elements may be a gasket and/or bonding agent. As a further enhancement, the sealing elements may be a pneumatic or inflatable bellows style gaskets, which provides a retractable sealing element without the dissembling the pressure boundary. Accordingly, the sealing element may be mechanically activated (e.g., inflated) after the adsorbent bed is disposed within the interior region of the housing to form a pressure boundary between the housing and the adsorbent bed or may be mechanically activated after the adsorbent bed is disposed within the interior region of the housing to form a pressure boundary between the housing and the adsorbent bed.

Beneficially, the configuration provides enhancements as compared to the conventional systems. For example, the adsorbent bed may be removed and reinstalled without dismantling the valves or process piping. Further, the ends of the adsorbent bed unit may be flanged with flat heads or with elliptical or hemispherical heads, which serve to reduce the wall thickness, which lessens cost and weight of the adsorbent bed unit. Further, one end of the adsorbent bed unit may be a welded closure and/or portion of the body portion to further lessen failure points. Also, this configuration is useful for applications involving low dead volume, and in which the adsorbent bed depth is relatively short (e.g., less than or equal to one meter). Moreover, the adsorbent bed length may be increased to accommodate a larger adsorbent bed volume and/or increased number of valves, as necessary, which may be developed for a unit flow rate and scaled to the desired flow rate by duplicating the configuration.

In one or more embodiments, the material may include an adsorbent material supported on a non-adsorbent support. Non-limiting examples of adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups, which may be used for $CO_2$ removal, may include primary, secondary, tertiary and other non protogenic basic groups such as amidines, guanidines and biguanides.

To manufacture systems and/or adsorbent bed units, various manufacturing techniques may be utilized. By way of example, the method of manufacturing a cyclical swing adsorbent bed unit may include: forming a housing having an interior region; creating a plurality of valve ports into the housing; securing a valve to the housing in each of the plurality of valve ports to form a plurality of valves; and disposing an adsorbent bed within the interior region of the housing wherein each of the plurality of valves is configured to control fluid flow along a flow path extending from a location external to the housing to the adsorbent bed, wherein each of the plurality the valve cross sectional areas are within an interface cross sectional area of the adsorbent bed and the aspect ratio of the interface cross sectional area is greater than 2. The method may also include that creating the plurality of valve ports into the housing comprises: forming a head, creating the plurality of valve ports into the head, and securing the head to a body portion to form the housing; or forming a head, forming a body portion, creating the plurality of valve ports into the body portion, securing the plurality of valve ports into the body portion, and securing the head to the body portion to form the housing. Moreover, the method may further comprise securing a common actuation mechanism to the plurality of valves, wherein the common actuation mechanism is configured to open or to close the plurality of valves, disposing a sealing element around the adsorbent bed prior to disposing an adsorbent bed within the interior region of the housing; and/or comprising mechanically activating or inflating the sealing element after the adsorbent bed is disposed within the interior region of the housing to form a pressure boundary between the housing and the adsorbent bed.

In one or more embodiments, the adsorbent bed unit may be utilized to separate contaminants from a feed stream. The method may include passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; performing a purge step, wherein the purge step reduces the pressure within the adsorbent bed unit and wherein the purge step involves passing a purge stream to a mid-purge distribution zone between first portion and the second portion; performing a re-pressurization step, wherein the re-pressurization step increases the pressure within the adsorbent bed unit; and repeating the steps a) to e) for at least one additional cycle.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

Further, the adsorbent bed units may include actively-controlled poppet valves and/or passively-controlled valves. The actively-controlled poppet valves, which may be referred to as actively-controlled poppet valve assemblies, may each include stem element secured to a disk element that is seatable within the head or a disk element that is seatable within a separate valve seat inserted within the head. The stem element may be connected to an actuating mechanism, such as electro-hydraulic or electro-pneumatic actuating mechanisms, which is configured to have the respective valve impart linear motion to the respective stem element. As may be appreciated, the actuating mechanism may be operated independently for different steps in the process to activate a single valve or a single actuating mechanism may be utilized to control two or more valves. As an example, opening an actively-controlled poppet valve may include linearly moving with a actuating mechanism at least one valve stem to provide an opening between a disk element coupled to the at least one valve stem and a seat secured to the housing of the adsorbent bed unit. As another example, opening actively-controlled poppet valves may include linearly moving a lift plate secured to the valve stems with an actuating mechanism to provide openings, wherein each of the valve stems is secured to a disk element and each of the openings forms a gap or flow path between the disk element and an associated seat secured to the housing of the adsorbent bed unit.

The passively-controlled valve may include passively-controlled poppet valves, passively-controlled check valves, passively-controlled reed valves, and the other suitable passively-controlled valves. For example, the passively-controlled poppet valves, which may be referred to as passively-controlled poppet valve assemblies, may each include stem element secured to a disk element that is seatable within the head or a disk element that is seatable within a separate valve seat inserted within the head. The stem element may be connected to a biasing mechanism, such as a spring or other biasing mechanisms, which is configured to have the respective valve impart linear motion to the respective stem element. As may be appreciated, the biasing mechanism may be operated independently for different steps in the process and may be activated based on a pressure differential to activate a single valve or two or more valves. One configuration of a passively-controlled poppet valve may include a spring-loaded passively-controlled poppet valve. In this spring-loaded configuration, the disk element may be an integral component with a hollow stem element, which has the springs disposed at least partially within the hollow stem element. As an example, the opening of passively-controlled poppet valves may include linearly moving with a product biasing mechanism at least one product valve stem to provide a product opening between a product disk element coupled to the at least one product valve stem and a product seat secured to the housing of the adsorbent bed unit. The product biasing mechanism may be configured to move linearly based on a pressure differential between the interior region and the product conduit exceeding a specific threshold. In other configurations, the linear movement based on the pressure differential may be different for various valves operating in phase. For example, the passively-controlled valves operating in phase may involve a range or a differential window of less than 25%, less than 20% or less than 10% (e.g., differential window may be calculated as the highest pressure differential minus the lowest pressure differential with that difference being divided by the highest pressure differential). As another example, a passively-controlled valve may also be configured as a reed-valve comprised of a flexible strip of metal or composite material anchored on one end and bending to open the passively controlled flow area. The passively-controlled reed valve may be utilized to provide more flow at a given differential pressure in a given footprint.

In certain embodiments, a swing adsorption system may be used for removing contaminants from a feed stream. By way of example, the contaminants may include $CO_2$. Accordingly, the system and process may be used to lower the $CO_2$ levels in the feed stream to below a predefined specifications in the product stream (e.g., less than or equal to 50 parts per million volume (ppmv) $CO_2$). As another example, the contaminants may include $H_2O$. The system and process may be used to lower the $H_2O$ levels in the feed stream to below a predefined specifications in the product stream (e.g., less than 150 ppmv of $H_2O$, less than 105 ppmv of $H_2O$, less than 30 ppmv of $H_2O$, less than 10 ppmv of $H_2O$, less than 1 ppmv of $H_2O$ or less than 0.1 ppmv of $H_2O$).

In one or more embodiments, the rapid cycle swing adsorption process in the present techniques is a rapid cycle temperature swing adsorption (RCTSA) and a rapid cycle pressure swing adsorption (RCPSA). For example, the total cycle times may be greater than 1 second, or greater than 2 seconds; and may be less than 600 seconds, may be less than 300 seconds, preferably less than 200 seconds, more preferably less than 100 seconds, may be less than 90 seconds, or even more preferably less than 60 seconds. By way of example, the cycle duration may be for a period greater than 1 second and less than 600 seconds, the cycle duration is for a period greater than 1 second and less than 300 seconds, or the cycle duration is for a period greater than 1 second and less than 200 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A cyclical swing adsorbent bed unit for removing contaminants from a gaseous feed stream, the adsorbent bed unit comprising:
    a housing forming an interior region;
    an adsorbent bed disposed within the interior region of the housing;
    a plurality of valves secured to the housing, wherein each of the plurality of valves is in flow communication with a conduit and configured to control fluid flow along a flow path extending from a location external to the housing through the conduit and to the adsorbent bed through the valve, wherein each of the plurality the valves has a valve cross sectional area within an interface cross sectional area of the adsorbent bed and the aspect ratio of the interface cross sectional area is greater than 2.

2. The cyclical swing adsorbent bed unit of claim 1, wherein the aspect ratio of the interface cross sectional area is in the range between 3 and 12.

3. The cyclical swing adsorbent bed unit of claim 1, wherein the aspect ratio of the interface cross sectional area is in the range between 3 and 7.

4. The cyclical swing adsorbent bed unit of claim 1, wherein the housing comprises a head coupled to a body portion to form the housing; and the plurality of valves are secured to the head.

5. The cyclical swing adsorbent bed unit of claim 1, wherein the housing comprises a head coupled to a body portion to form the housing; and the plurality of valves are secured to the body portion.

6. The cyclical swing adsorbent bed unit of claim 1, further comprising a sealing element disposed between the housing and the adsorbent bed.

7. The cyclical swing adsorbent bed unit of claim 1, wherein two or more of the plurality of valves are operated via common actuation mechanism.

8. The cyclical swing adsorbent bed unit of claim 1, wherein the housing is configured to maintain a pressure from 5 pounds per square inch absolute (psia) and 1,400 psia.

9. A process for removing contaminants from a feed stream, the process comprising:
  a) performing one or more adsorption steps in an adsorbent bed unit, wherein each of the one or more adsorption steps comprise: (i) opening a plurality of feed poppet valves to pass a gaseous feed stream from a feed inlet conduit to an adsorbent bed disposed in an interior region of a housing of the adsorbent bed unit, wherein each of the plurality of feed poppet valves is in direct flow communication with the feed inlet conduit and configured to control fluid flow along a flow path extending from a location external to the housing through the feed inlet conduit and to the adsorbent bed, wherein each of the plurality of feed poppet valves has a valve cross sectional area within an interface cross sectional area of the adsorbent bed and the aspect ratio of the interface cross sectional area is greater than 2, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit;
  b) performing one or more purge steps, wherein each of the one or more purge steps comprise passing a purge stream into the adsorbent bed unit to conduct away at least a portion of the one or more contaminants in a purge output stream; and
  c) repeating the steps a) to b) for at least one additional cycle, wherein the cycle duration is for a period greater than 1 second and less than 600 seconds.

10. The process of claim 9, wherein the aspect ratio of the interface cross sectional area is in the range between 3 and 12.

11. The process of claim 9, wherein the aspect ratio of the interface cross sectional area is in the range between 3 and 7.

12. The process of claim 9, wherein the opening the plurality of feed poppet valves further comprises moving a common actuation mechanism to open the plurality of valves.

13. The process of claim 9, wherein opening the plurality of feed poppet valves further comprise linearly moving with a feed actuating mechanism at least one feed valve stem to provide a feed opening between a feed disk element coupled to the at least one feed valve stem and a feed seat secured to the housing of the adsorbent bed unit.

14. The process of claim 9, wherein the cycle duration is for a period greater than 1 second and less than 300 seconds to separate one or more contaminants from the gaseous feed stream to form the product stream.

15. The process of claim 9, wherein the gaseous feed stream is a hydrocarbon containing stream having greater than one volume percent hydrocarbons based on the total volume of the gaseous feed stream.

16. The process of claim 9, wherein a feed pressure of the gaseous feed stream is in the range between 400 pounds per square inch absolute (psia) and 1,400 psia.

17. The process of claim 9, wherein performing the one or more adsorption steps is configured to lower the carbon dioxide ($CO_2$) level to less than 50 parts per million volume.

18. The process of claim 9, wherein performing the one or more adsorption steps is configured to lower the water ($H_2O$) level to less than 105 parts per million volume.

19. A method of manufacturing a cyclical swing adsorbent bed unit, the method comprising:
  forming a housing having an interior region;
  creating a plurality of valve ports into the housing;
  securing a valve to the housing in each of the plurality of valve ports to form a plurality of valves; and
  disposing an adsorbent bed within the interior region of the housing wherein each of the plurality of valves is configured to control fluid flow along a flow path extending from a location external to the housing to the adsorbent bed, wherein each of the plurality of valves has a valve cross sectional area within an interface cross sectional area of the adsorbent bed and the aspect ratio of the interface cross sectional area is greater than 2.

20. The method of claim 19, wherein the creating the plurality of valve ports into the housing comprises:
  forming a head;
  creating the plurality of valve ports into the head; and
  securing the head to a body portion to form the housing.

21. The method of claim 19, further, wherein the creating the plurality of valve ports into the housing comprises:
  forming a head;
  forming a body portion;
  creating the plurality of valve ports into the body portion;
  securing the plurality of valve ports into the body portion; and
  securing the head to the body portion to form the housing.

22. The method of claim 19, further comprising securing a common actuation mechanism to the plurality of valves, wherein the common actuation mechanism is configured to open or to close the plurality of valves.

23. The method of claim 19, further comprising disposing a sealing element around the adsorbent bed prior to disposing an adsorbent bed within the interior region of the housing.

24. The method of claim 23, further comprising mechanically activating the sealing element after the adsorbent bed is disposed within the interior region of the housing to form a pressure boundary between the housing and the adsorbent bed.

* * * * *